UNITED STATES PATENT OFFICE.

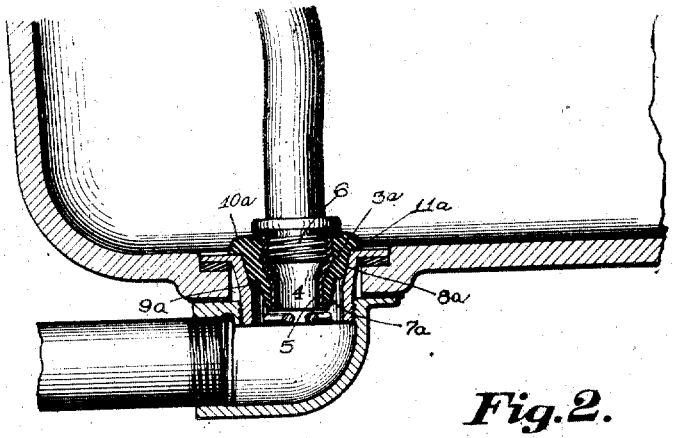
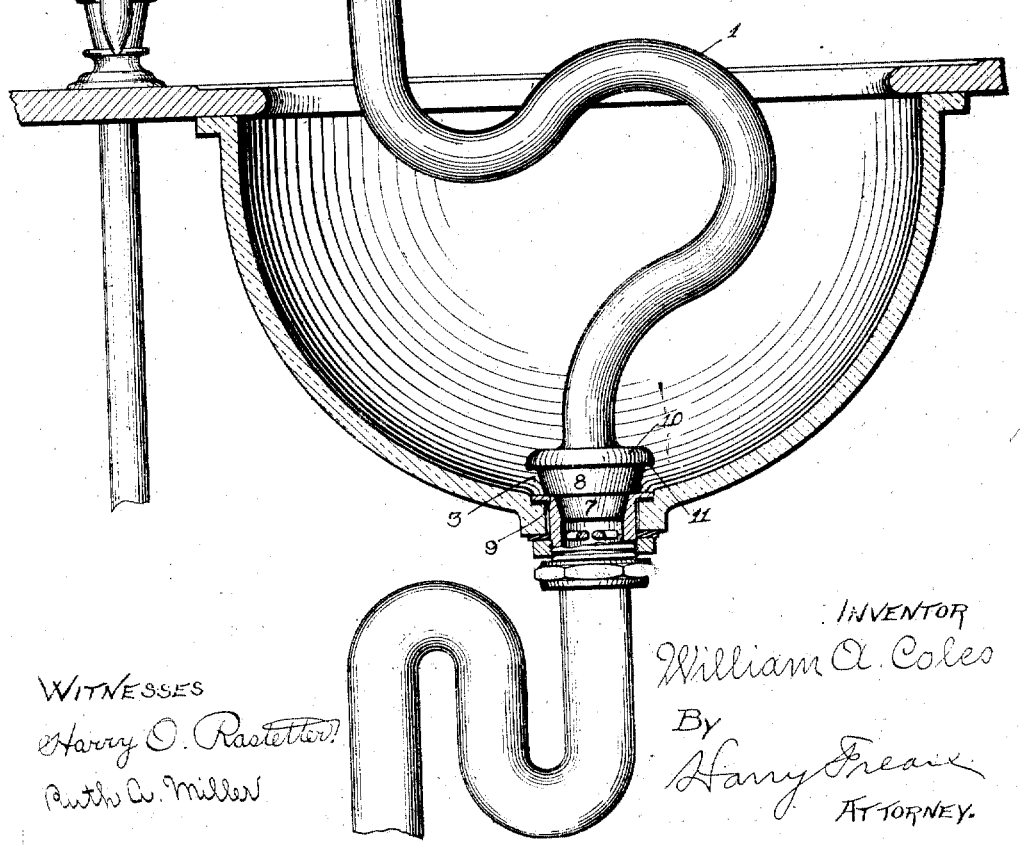

WILLIAM A. COLES, OF CANTON, OHIO, ASSIGNOR OF ONE-HALF TO ULYSSES A. BRETING, OF CANTON, OHIO.

DRAIN-PIPE PLUG AND FLUSHING-NOZZLE.

994,442.	Specification of Letters Patent.	Patented June 6, 1911.

Application filed August 16, 1910. Serial No. 577,509.

*To all whom it may concern:*

Be it known that I, WILLIAM A. COLES, a citizen of the United States, residing at Canton, in the county of Stark and State of Ohio, have invented a certain new and useful Drain-Pipe Plug and Flushing-Nozzle, of which the following is a specification.

The invention relates to a nozzle applied to hose for flushing drain pipes, and adapted to be used as a plug when made detachable from the hose.

In flushing drain pipes with hose, it is difficult to make a tight joint between the hose and the opening of the drain pipe, and a principal object of the present improvement is to overcome this difficulty by providing a resilient tapered nozzle adapted to be wedged in the drain opening and having an annular shoulder adapted to be seated around the mouth of the opening to completely seal the joint.

A further feature of the improvement involves the use of a nozzle having two or more tapered sections of different sizes adapted to fit drain openings of different diameters, and so arranged that the lower end of the larger section forms the sealing shoulder for the smaller section.

The improvement also includes the use of such a nozzle, when made detachable from the hose, as an ordinary drain pipe plug, by merely closing the aperture in the nozzle with a screw cap, having an ordinary ring or other handle thereon.

A preferred form of the invention, thus set forth in general terms, is illustrated in the accompanying drawing, forming part hereof, in which—

Figure 1 is the section of a wash basin showing a hose connected with the faucet and showing the improved nozzle on the other end of the hose, inserted for use in the drain opening; Fig. 2, a fragmentary section of a bath tub showing a flushing hose with a detachable nozzle inserted for use in the drain opening; and Fig. 3, a sectional view of a detached nozzle with its aperture closed by a screw cap, and adapted to be used as a plug.

Similar numerals refer to similar parts throughout the drawing.

The hose 1 is connected at its upper end with the faucet 2, preferably by slipping it over the mouth of the faucet, as shown in Fig. 1, although this particular form of connection is not essential and forms no part of the present invention.

The nozzle 3 or 3ª is preferably made of resilient material, as tough rubber or the like, and is either formed integral with the lower free end of the hose, as shown in Fig. 1; or is provided with the axial aperture 4 preferably lined with the sheet metal 5 adapted to be screwed onto the usual hose fitting 6, as shown in Fig. 2. In either case, the lower section 7 or 7ª of the nozzle is formed as a truncated cone of such a size as will fit tightly by being wedged into the drain pipe opening of a wash basin; and the upper section 8 or 8ª is similarly made as a truncated cone of a larger size as will fit tightly by being wedged into the drain pipe opening of a bath tub.

The parts are so proportioned and arranged that the shoulder 9 or 9ª formed by the lower end of the larger section is adapted to be seated around the opening of the wash stand drain pipe when the smaller section of the nozzle is wedged in the opening, thus completely sealing the joint, as shown in Fig. 1; and the annular flange 10 or 10ª is provided around the upper end of the larger section forming the shoulder 11 or 11ª which is adapted to be seated around the mouth of the bath tub drain opening when the larger section is wedged in the opening, as shown in Fig. 2. In either case, the resilience of the material out of which the nozzle is made permits the nozzle section pertaining to a particular opening to be wedged therein until the corresponding shoulder is firmly seated around the mouth of the opening, thus completely sealing the joint.

When the nozzle is made detachable, as shown in Fig. 2, it is adapted to be used as an ordinary plug by merely unscrewing it from the hose and then securing the screw cap 12 in the axial opening, which cap is preferably provided with the ring 13 which in turn is connected with the usual plug chain 14, as shown in Fig. 3.

It will be understood that the scope of the invention is not limited to the use of two truncated cone-sections, as shown in the drawings, although such form of the nozzle is satisfactory for ordinary purposes; and it will furthermore be understood that in the use of a nozzle as a plug it is immaterial whether the nozzle is made up of one or more cone-shaped sections. And in event the drain pipe openings of wash basins and bath tubs are made of standard sizes, it is evident that the sections of the nozzle can be made of corresponding sizes to exactly fit the opening, and in such case it is not essential to make the nozzle of resilient material.

I claim:

1. A nozzle for flushing drain pipes formed in sections of different sized truncated cones, the lower end of the larger section forming a shoulder around the upper end of the smaller section, and a shoulder being formed around the larger end of the upper section.

2. A nozzle for flushing drain pipes made of resilient material and formed in sections of different sized truncated cones, the lower end of the larger section forming a shoulder around the upper end of the smaller section, and a shoulder being formed around the larger end of the upper section.

3. A nozzle for flushing drain pipes formed in sections of different sized truncated cones, the lower end of the larger section forming a shoulder around the upper end of the smaller section, and a shoulder being formed around the larger end of the upper section, there being an axial aperture in the nozzle provided with a screw thread adapted to receive a hose-fitting or a screw-cap.

4. A nozzle for flushing drain pipes made of resilient material and formed in sections of different sized truncated cones, the lower end of the larger section forming a shoulder around the upper end of the smaller section, and a shoulder being formed around the larger end of the upper section, there being an axial aperture in the nozzle provided with a screw thread adapted to receive a hose-fitting or a screw-cap.

5. A nozzle for flushing drain pipes made of resilient material having a truncated cone section with a shoulder around the larger end and having an axial aperture therein provided with a screw thread adapted to receive a hose-fitting or a screw-cap.

6. A nozzle for flushing drain pipes having a truncated cone section with a shoulder around the larger end and having an axial aperture therein provided with a screw thread adapted to receive a hose-fitting or a screw-cap.

WILLIAM A. COLES.

Witnesses:
FERD. J. ZETTLER,
RUTH A. MILLER.